Dec. 18, 1956  L. A. DE ROSA  2,774,965
RADIO DETECTION SYSTEM
Filed Feb. 6, 1943  2 Sheets-Sheet 2
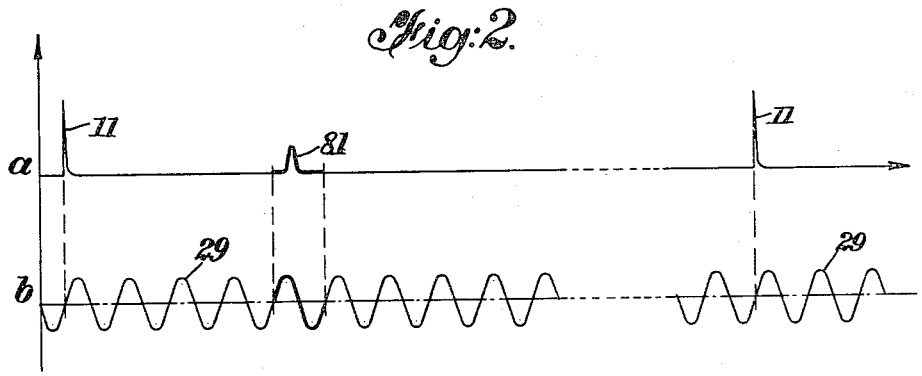
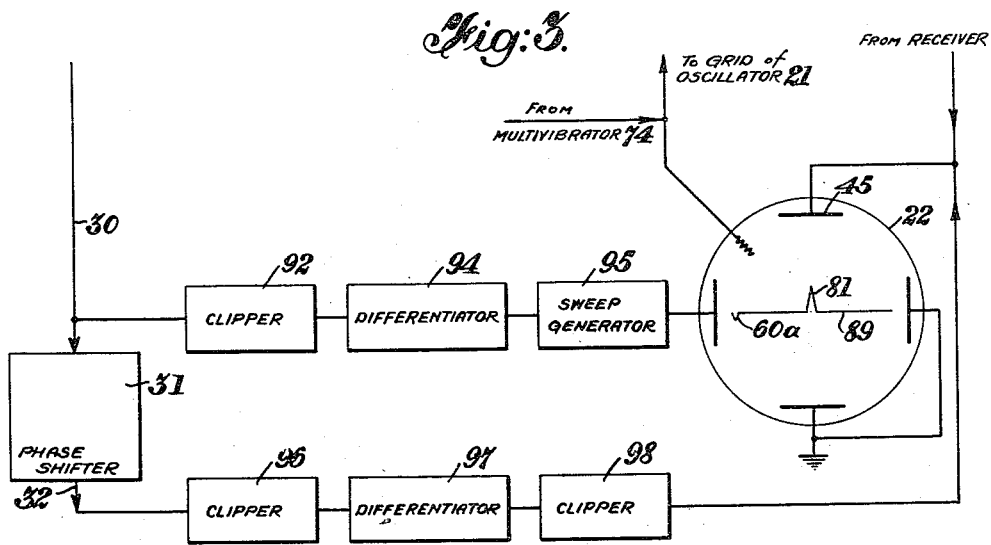
INVENTOR.
LOUIS A. DE ROSA
BY *Percy P. Lantzy*
ATTORNEY United States Patent Office 2,774,965
Patented Dec. 18, 1956

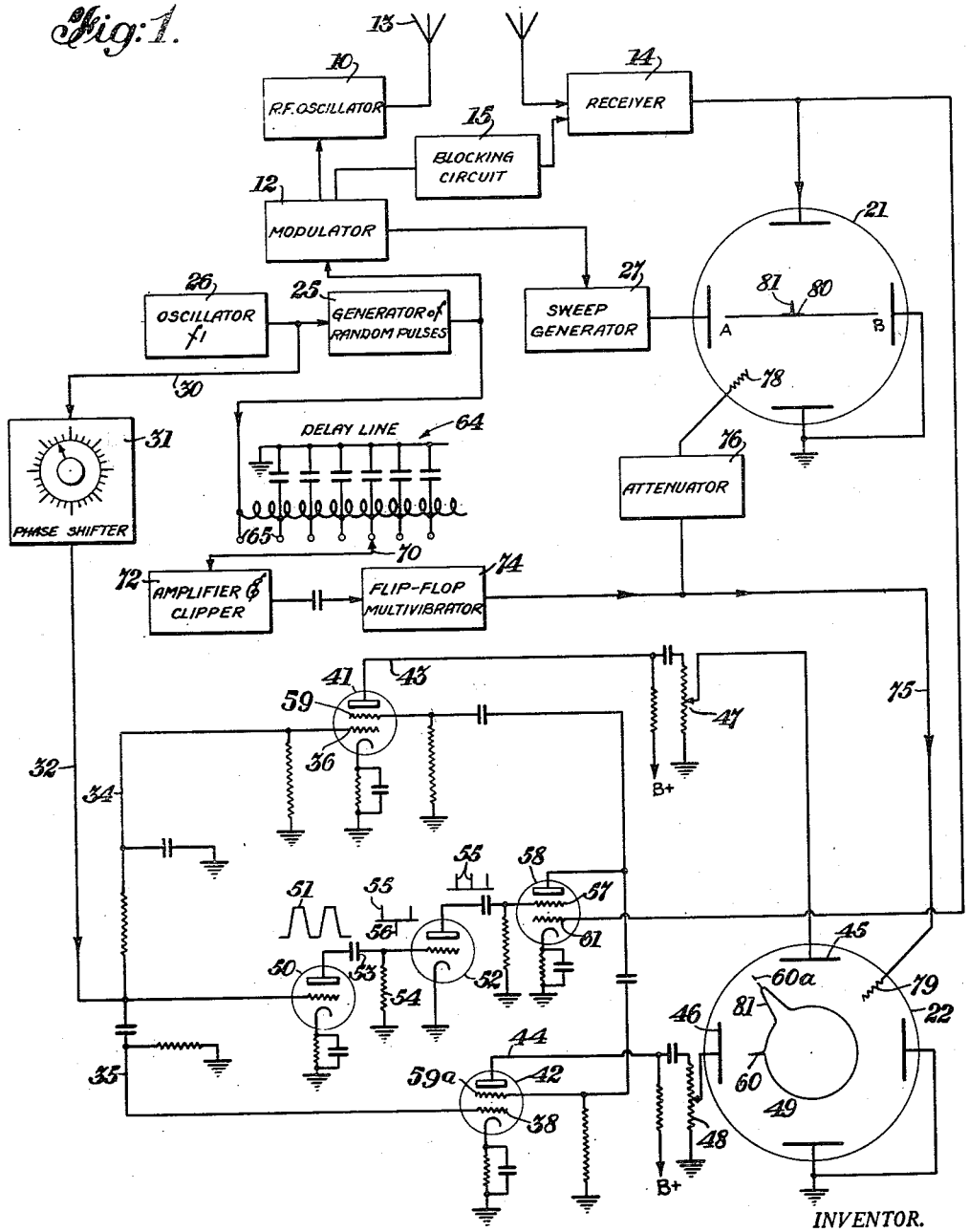

2,774,965

RADIO DETECTION SYSTEM

Louis A. De Rosa, Staten Island, N. Y., assignor to International Telephone and Telegraph Corporation, a corporation of Maryland Application February 6, 1943, Serial No. 474,967

10 Claims. (Cl. 343—13)

This invention relates to radio detection systems such as used for detecting and determining the distance to hostile aircraft and ships.

In my copending application Serial No. 464,008 filed October 31, 1942, now Patent No. 2,703,401, issued March 1, 1955, I show several embodiments of radio detection system in which I use first and second oscillographs, the first oscillograph to obtain an approximate indication or panoramic view of the location of obstacles within a given range such as 200 miles more or less, and the second oscillograph to provide for a more accurate or vernier indication of the distance to a selected one of the obstacles detected by the first oscillograph.

It is an object of this invention to provide a method and means in addition to the methods and means disclosed in my aforesaid copending application for determining with a high degree of accuracy the distance to obstacles detected thereby.

The above and other objects of the invention will become more apparent upon consideration of the following detailed description to be read in connection with the accompanying drawings, in which Fig. 1 is a schematic illustration of a radio detection system in accordance with my invention;

Fig. 2 is a graphical illustration of the operating features of the invention, and Fig. 3 is a schematic illustration showing another embodiment of the invention.

Referring to Fig. 1, the radio detection system therein illustrated includes a transmitter comprising an R. F. oscillator 10 and a modulator 12 by which impulses are transmitted over an antenna 13. A receiver 14 receives reflections of the transmitted impulses caused by obstacles within the range of the system. The receiver is blocked by the usual blocking circuit 15 controlled by energy from the modulator 12 during transmission of impulses. The received reflections are applied to first and second cathode ray oscillographs 21 and 22. The first oscillograph 21 is adapted to indicate approximately the location of reflecting obstacles while the second oscillograph provides an expanded view of a portion of the time base of the oscillograph 21 so that vernier measurement of the distance to a particular obstacle can be made. The method and means by which this vernier measurement is performed will become more apparent as the description proceeds.

The transmitted impulses may be steady, that is, they may be of a given frequency, or they may be random. In my copending application entitled "Impulse Systems," Serial No. 469,419, filed December 18, 1942, now Patent No. 2,671,896 issued March 9, 1954, I disclose a pulse generating means having a source of oscillations in which a series of steady pulses of a given displacement are produced, which I use as a basis for the generation of random pulses, the occurrence of which are determined by mixing the series of steady pulses a source of random noise oscillations. This results in the production of random pulses, the displacements between the successive pulses of which are equal to random multiples of the given displacement of the steady pulses. These random pulses may, therefore, be described as occurring in time with random periods of the oscillations.

In Fig. 1 of the present invention, I have indicated by a block diagram a pulse generator 25 of the character disclosed in my aforesaid copending application connected to a source of oscillations 26. The source of oscillations for the pulse generator 25 is shown as oscillator 26 and the oscillating wave generated is indicated in Fig. 2 as wave 29. Since the random pulses are used for synchronizing the modulator 12, the impulses 11 will be in synchronism with random oscillations of the wave 29.

The time base or sweep for the oscillograph 21 is synchronized with transmission of impulses 11 by conduction of energy from the modulator 12 to a sweep generator 27. The time base or sweep of the oscillograph 22, however, is synchronized with the periods of oscillation of the wave 29. The sweep of the oscillograph may either be linear or circular. For the circular sweep indicator in Fig. 1, I first apply the oscillations 29 through line 30 to a calibrated phase shifter 31 of the character capable of shifting the phase of the wave approximately 360°. This provides for vernier measurement as will be made clear hereinafter. The output 32 of the phase shifter is applied to a phase splitter circuit 34 and 35, the energy passing over the portion 34 being caused to lag and the energy passing over the portion 35 being caused to lead by substantially 45°. The circuit portion 34 is applied to the grid 36 of a vacuum tube 41 and the circuit portion 35 is connected to the grid 38 of a vacuum tube 42. The anode circuit 43 of the tube 41 is applied to the vertical deflection plate 45 of the oscillograph 22, and the anode circuit 44 of the tube 42 is applied to the horizontal deflection plate 46 of the oscillograph 22, thereby producing a circular sweep on the oscillograph screen for each period of the wave 29. These anode circuits are provided with adjustable resistors 47 and 48, respectively for adjusting the circular sweep, on the screen.

In order to determine the beginning of each circular sweep in time relation with the oscillations of the wave 29, I provide a clipper amplifying tube 50 and connect it to the output 32 of the phase shifter 31. The tube 50 clips the oscillations to produce a substantially rectangular wave 51. The output of the clipper 50 is applied to a differentiating circuit including a condenser 53 and a resistor 54 to produce alternately positive and negative pulses 55 and 56. These pulses are applied to a second clipper stage 52 to limit the output to the positive pulses 55. These unidirectional pulses are applied to a grid 57 of a mixer tube 58. The anode of the tube 58 is connected to grids 59 and 59a of the tubes 41 and 42. It will be clear that each pulse 55 represents the beginning of a period of oscillation of the wave 29. The pulses 55 produce momentary increase of current flow in the tubes 41 and 42, thereby increasing momentarily the radial amplitude of the sweep 49, producing a sharp vernier reference pulse 60.

Echo pulses received by the receiver 14 are applied to a second grid 61 of the mixer tube 58. Electron movement produced in the tube 58 in response to the echo pulses is applied to the grids 59 and 59a of tubes 41 and 42 thereby producing for a particular echo pulse a pulsation 81 in the sweep 49.

In order to control the perceptibility of the sweep 49 and to provide a reference indicator on the trace line A—B of the oscillograph 21 to indicate the portion of the time base thereof covered by the perceptible sweep on the second oscillograph 22, I utilize energy of the random synchronizing pulses produced by the generator 25. These random synchronizing pulses are applied to a delay line 64 formed of a network of inductances and condensers and having a number of outlets 65. The retardation time represented by the portion of the line between the adjacent outlet taps 65 is taken approximately equal to a period of the wave 29.

An adjustable contact 70 adapted to be moved from tap to tap is connected to an amplifier and clipper 72 whereby the shape of the random pulses is sharpened to overcome the filtering effect of the delay line 64. The sharpened retarded pulses are then applied to a flip-flop type of multi-vibrator 74, which is adjusted to flip from a first state of operation to another upon application of a pulse and to flop back to the first state of operation after a period of time selected preferably equal approximately to the period of the wave 29. This provides a rectangular sweep controlling pulse of the duration equal to the period of the wave 29, and when applied through an attenuator 76 to a beam intensity control such as a grid 78 of the oscillograph 21, a portion 80 of the trace line A—B corresponding to the duration of the rectangular pulse is rendered more brilliant then the rest of the line. The rectangular pulse of the multi-vibrator 74 is also applied over connection 75 to the beam intensity control grid 79 of the oscillograph 22. Since the rectangular pulse from the multi-vibrator 74 is of the period approximately equal to a period of the wave 29, only one of the several circular sweeps 49 will be rendered perceptible for such transmission of an impulse 11. Thus, the oscillograph 22 is provided with a multiple of circular tracings between the occurrence of the impulses 11 and only one of these tracings may be picked out for perception in accordance with the positioning of the contact 70 or the delay line 64.

Assume that a reflection of echo pulse 81 appears on the oscillograph 21 and the contact 70 has been adjusted to a tap on the delay line 64 so as to cause the indicator 80 to include a reflection pulse 81 as indicated. This will cause the reflection pulse 81 to appear on the screen of the oscillograph 22, since the perception of the sweeps 49 is shifted according to adjustment of the indicator 80. By adjusting the phase shifter 31 the vernier reference pulse 60 is caused to move to the location of the echo pulse 81 and to be superimposed thereupon as indicated by the broken line 60a. In this position, the distance to the obstacle causing the echo pulse 81 is determined by the sum of the readings of the position of the contact 70 on the delay line 61, and the reading of the adjustment of the phase shifter 31.

Instead of having the vernier reference pulse 60 cause an outward deviation in the sweep line 49, it may be arranged to produce an inward deviation by use of negative pulses 56. The difference in the timing of the pulses 56 with respect to the occurrence of pulses 55 could be compensated for by adjustment of the calibration for the phase shifter 31.

In Fig. 3, I have shown a modified form of sweep circuit for the oscillograph 22, whereby the linear sweep 89 is provided in place of the circular sweep 49. This linear sweep is repeated once for each oscillation of the wave 29. The sweep is produced by applying the wave 29 through a clipper 92 and a differentiator 94 before application to a sweep generator 95. The sweep generator 95 is preferably of the sawtooth generating character and produces a sweep for each positive pulse from the differentiator 94.

The reference pulse 60a in this case is produced from the wave 29 after passing through phase shifter 31 by passing it through a clipper 96 and a differentiator 97. So as to apply a single pulse for each period of the wave 29, the output of the differentiator 97 is passed through a clipper stage 93 and then applied to the deflection plate 45. The amplifier 98 transposes and clips the positive pulse so that the reference pulse 60a is now negative with respect to the reflection pulse 81.

While I have disclosed the principles of my invention in connection with two specific systems, it will be understood that the two are given by way of example only, and not as limiting the scope of the invention as set forth in the objects and the appended claims.

I claim:

1. In a radio detection system having a transmitter, and at least one oscillograph provided with a sweep producing means for indicating purposes, the combination therewith of means to generate an oscillating wave, means to effect random transmission of impulses in synchronism with certain of the periods of said wave, means to synchronize the sweep of said oscillograph with periods of said wave, means to generate in synchronism with said impulses a sweep controlling pulse of duration equal approximately to a period of said wave, and means to apply said sweep controlling pulse to said oscillograph to control the perceptibility of the sweep thereof.

2. In a radio detection system having a transmitter, a receiver and first and second oscillographs for indicating an echo pulse, produced by an obstacle in response to a transmitted impulse, the combination therewith of means to generate an oscillating wave of a given frequency, means to synchronize transmission of impulses with certain of the periods of said wave, means to synchronize the sweep of the first oscillograph with the transmission of said impulses, means to synchronize the sweep of the second oscillograph with periods of said wave, means to generate in synchronism with said impulses a sweep controlling pulse of a given duration, means to apply the sweep controlling pulse to the first oscillograph to produce a reference indicator designating a time interval thereon corresponding to said duration, and means to apply the sweep controlling pulse to the second oscillograph to render perceptible thereon a sweep of the same duration.

3. The system defined in claim 2, wherein the second oscillograph includes a beam intensity control element and the sweep circuit for the second oscillograph is arranged to provide a circular sweep, and the means for applying the sweep controlling pulse to the second oscillograph comprises means for applying energy thereof to said beam intensity control element so as to render perceptible a portion of the circular sweep corresponding to the duration of the sweep controlling pulse.

4. In a radio detection system having a transmitter, a receiver and first and second oscillographs for indicating an echo pulse produced by an obstacle in response to a transmitted impulse, the combination therewith of means to generate an oscillating wave of a given frequency, means to synchronize transmission of impulses with certain of the periods of said wave, means to synchronize the sweep of the first oscillograph with the transmission of said impulses, means responsive to said oscillating wave to produce for said second oscillograph a circular sweep for each period of said wave, means to generate in synchronism with said impulses a sweep controlling pulse of a duration equal to the period of said wave, said second oscillograph having a beam entensity control element, means to apply said sweep controlling pulse to said beam intensity control circuit to render perceptible a portion of the circular sweeps thereof, and means to apply the sweep controlling pulse to said first oscillograph to produce a reference indicator thereon designating the portion of the range thereof covered by the perceptible sweep of said second oscillograph.

5. The system defined in claim 4, wherein the means for generating the sweep controlling pulse includes a delay line adjustable to vary the occurrence of the sweep controlling pulse with respect to the transmission of said impulses thereby causing the perceptible sweep of the second oscillograph to be shifted in time in accordance with the retardation of the sweep controlling pulse.

6. The system defined in claim 4, in combination with a clipper to produce a rectangular wave form from said oscillating wave, differentiating means to produce alternate and positive and negative pulses from the rectangular wave, and means to apply one type of said pulses as a reference pulse to the sweep circuit of the second oscillograph to produce a deviation in the sweep line defining a demarcation point between successive cycles of the circular sweep.

7. The system defined in claim 4, wherein the means for generating the sweep controlling pulse includes a delay line adjustable to vary the occurance of the sweep controlling pulse with respect to the transmission of said impulses thereby causing the perceptible sweep of the second oscillograph to be shifted in time in accordance with the retardation of the sweep controlling pulse, in combination with a clipper to produce a rectangular wave form from said oscillating wave, differentiating means to produce alternate positive and negative pulses from the rectangular wave, and means to apply one type of said pulses as a reference pulse to the sweep circuit of the second oscillograph to produce a deviation in the sweep line defining a demarcation point between successive cycles of the circular sweep.

8. In a radio detection system having a transmitter, and at least one oscillograph provided with a sweep producing means for indicating purposes, the combination therewith of means to generate an oscillating wave, means for generating random pulses for the transmitter synchronized with certain periods of said wave, the random character of the impulses being equal to random multiples of the periods of the wave, means to synchronize the sweep of said oscillograph with periods of said wave, means to generate in synchronism with said impulses a sweep controlling pulse of a given duration, and means to apply said sweep controlling pulse to said oscillograph to control the perceptibility of the sweep thereof.

9. In a radio detection system having a transmitter, and at least one oscillograph provided with a sweep producing means for indicating purposes, the combination therewith of means to generate an oscillating wave, means to synchronize transmission of the impulse with certain of the periods of said wave, means to synchronize the sweep of said oscillograph with periods of said wave, means to generate in synchronism with said impulses a sweep controlling pulse of a given duration, means to apply said sweep controlling pulse to said oscillograph to control the perceptibility of the sweep thereof, a clipper to produce a rectangular wave form from said oscillating wave, differentiating means to produce alternate positive and negative pulses from said rectangular wave, means to apply one type of said pulses as a reference pulse to the sweep circuit of the oscillograph, and means to shift the phase of said oscillating wave to effect movement of said reference pulse along the sweep line of the oscillograph.

10. The combination of a pair of cathode ray oscillograph devices each having a viewing screen, a master oscillator generating a sine wave, a sweep circuit energized by said oscillator for periodically sweeping the ray of one of said devices over a circular trace path at the frequency of said oscillator, means controlled by said oscillator for periodically sweeping the ray of said other device over a predetermined path at a lower frequency than the oscillator frequency, means normally to maintain the ray of said one device interrupted, means producing a control pulse of the same frequency as the sweep frequency of said other device and of a duration equal to one period of said oscillator, means for applying said control pulse to said one device to turn on the ray thereof, and variable means to shift the phase of said control pulse with respect to the sweep cycle of said other device.

References Cited in the file of this patent

UNITED STATES PATENTS

| 1,979,225 | Hart | Oct. 30, 1934 |
| 2,227,598 | Lyman et al. | Jan. 7, 1941 |
| 2,300,189 | Wolff | Oct. 27, 1942 |

FOREIGN PATENTS

| 113,233 | Australia | June 2, 1941 |